W. H. THORPE.
TIRE INFLATION SIGNAL.
APPLICATION FILED DEC. 18, 1919.

1,357,009.

Patented Oct. 26, 1920.

Inventor
William H. Thorpe
by his Attorney
William G. McKnight

UNITED STATES PATENT OFFICE.

WILLIAM H. THORPE, OF MOUNT VERNON, NEW YORK.

TIRE-INFLATION SIGNAL.

1,357,009.   Specification of Letters Patent.   Patented Oct. 26, 1920.

Application filed December 18, 1919. Serial No. 345,782.

*To all whom it may concern:*

Be it known that I, WILLIAM H. THORPE, a subject of the King of Great Britain, and a resident of Mount Vernon, county of Westchester, and State of New York, have invented certain new and useful Improvements in Tire-Inflation Signals, of which the following is a description.

The primary object of this invention is to provide a warning signal to indicate when the inflation pressure in a pneumatic tire is so low that the tire would be injured by further use in such a condition.

Such a signal may be visible, or audible. If visible, it should be so arranged as to give an indication visible to the driver when he sits in the driver's seat of the vehicle. Likewise, an audible signal should be audible to the driver.

While my invention includes any device for giving a signal such as referred to above, the particular embodiment of my invention, which I will illustrate and describe herein, comprises a tire valve attachment arranged, upon the rotation of the tire, to give an audible signal when the inflation pressure is reduced below the predetermined amount.

Figure 2:
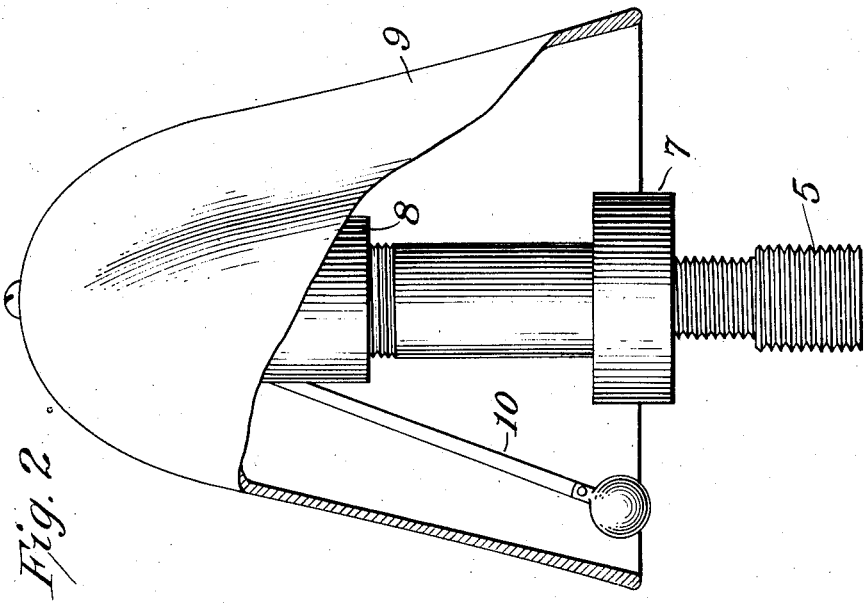
Figure 1:
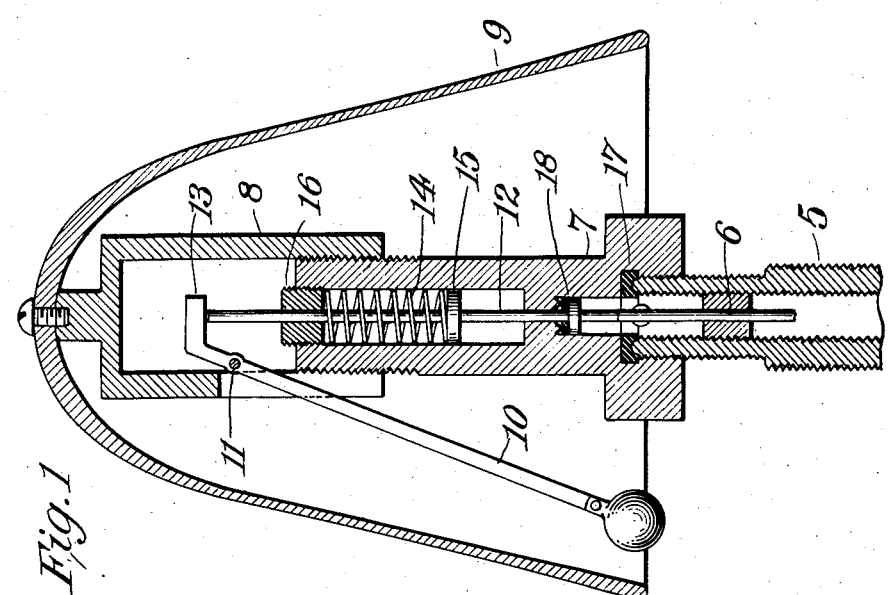

In the accompanying drawing Figure 1 is a longitudinal cross sectional view of my attachment applied to a usual tire valve, and Fig. 2 is a front elevation thereof, a portion of the bell being cut away.

The valve nipple 5 and valve stem 6 are of the usual construction. However, in place of the usual valve cap I apply to the nipple 5 the supporting member 7 of my attachment, this member being provided at one end with internal screw threads and being adapted to be applied to and removed from the nipple in the manner of the usual cap.

Adjustably mounted upon the opposite end of the member 7 is the member 8, to the top of which is secured the bell or gong 9. The striker 10 for this bell is pivoted at 11 upon the member 8, but when the inflation pressure of the tire is above the predetermined amount, this striker is prevented from striking the bell, by the plunger 12 which underlies the offset end 13 of the striker.

This plunger 12 is mounted for longitudinal movement within the supporting member 7. The lower end of the plunger rests upon the valve stem 6. The expansion spring 14, interposed between the collar 15 of the plunger and the adjustable screw threaded abutment 16, constantly tends to depress the plunger and thus release the bell striker. But so long as the inflation pressure of the tire remains above the predetermined amount, the valve stem will support the plunger and prevent its being depressed by the spring 14. When, however, the inflation pressure of the tire is reduced below this amount, the force of the spring will overcome the resistance of the valve stem, and the plunger will be depressed and the bell striker released.

With the bell striker free to oscillate, it is evident that the normal rotation of the tire with the vehicle wheel to which it is attached will result in the striking of the bell at least once every rotation.

The pressure below which my improved signal will operate may be varied, as desired, by varying the size of the spring 14 or by adjusting the abutment 16. The adjustability of the member 8 permits the bell-striker to be so positioned that it will be held securely when the tire is properly inflated.

Suitable packing material, such as indicated at 17, 18, is preferably employed in order to prevent escape of air from the tire when the valve stem is depressed.

Obviously, the mechanism above described may be varied widely within the scope of my invention. For example, a spring operated bell, or other signal, might be held against operation by the plunger so long as the tire is properly inflated, and released for operation by the depression of the plunger upon undue deflation of the tire. Also, the plunger might be arranged to coöperate with a part attached to the vehicle itself, so that the depression of the plunger would control a visible signal on the dash board. Various other modifications will appear to those skilled in the art.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. A self-contained attachment for the valve of a pneumatic tire or the like, including a bell, a striker for said bell, means supported by the valve stem for holding said striker inoperative when the inflation pressure of the tire is above a predetermined amount, and spring means opposing the supporting action of the valve stem for moving said holding means so as to release said striker when such pressure is below said amount, without permitting the escape of air through said valve.

2. A self-contained attachment for the valve of a tire or the like, including a bell, a striker for said bell operable by the rotation of the tire, and means supported by the valve stem for holding said striker inoperative when the inflation pressure of the tire is above a predetermined amount, and means opposing the supporting action of the valve stem for moving said holding means so as to release said device when such pressure is below said amount.

3. A self-contained attachment for the valve of a tire or the like, including a bell, a striker for said bell operable by the rotation of the tire, and means for holding said striker inoperative when the inflation pressure of the tire is above a predetermined amount and for releasing said striker when such pressure is below said amount, without permitting the escape of air through said valve.

4. A self-contained attachment for the valve of a pneumatic tire including a signal device operable by the rotation of the tire and means supported by the valve stem for holding said device inoperative when the inflation pressure of the tire is above a predetermined amount, and means opposing the supporting action of the valve stem for moving said holding means so as to release said device when such pressure is below said amount, without permitting the escape of air through said valve.

WILLIAM H. THORPE.